US005345717A

United States Patent [19]

Mori et al.

[11] Patent Number: 5,345,717

[45] Date of Patent: Sep. 13, 1994

[54] WINDOW CONSTRUCTION FOR VEHICLES

[75] Inventors: Akiyoshi Mori, Chita; Katsuzi Sakuma, Toyota; Joichi Bansho, Himi, all of Japan

[73] Assignees: Aisin Seiki Kabushiki Kaisha; Aisin Keikinzoku Kabushiki Kaisha, both of Japan

[21] Appl. No.: 112,607

[22] Filed: Aug. 27, 1993

[30] Foreign Application Priority Data

Aug. 31, 1992 [JP] Japan ................................ 4-231038

[51] Int. Cl.[5] ............................................ E05D 15/06

[52] U.S. Cl. ........................................ 49/404; 49/380; 49/413; 49/440; 296/146.16

[58] Field of Search ................. 49/404, 440, 441, 413, 49/435, 380; 52/207; 296/146.15, 146.16, 201, 96.21

[56] References Cited

U.S. PATENT DOCUMENTS 4,785,583 11/1988 Kawagoe et al. .................... 49/404

5,228,740 7/1993 Saltzman .............................. 49/440

FOREIGN PATENT DOCUMENTS 61-80114 5/1986 Japan .

61-80117 5/1986 Japan .

*Primary Examiner*—Philip C. Kannan

*Attorney, Agent, or Firm*—Finnegan, Henderson, Farabow, Garrett & Dunner

[57] ABSTRACT

A window construction for vehicle includes a sash frame rectangular in shape for receiving glass panes in a window opening thereof, and a seal member secured to the sash frame and adapted to be mounted on a vehicle's body. The sash frame has a projection extending outwardly from the outer surface thereof, and the seal member has a recess or groove in which the projection is fitted. The seal member has one hook for gripping the edge of the inside wall of the sash frame and one abutment portion for abutment engagement with the edge of the outside wall of the sash frame.

7 Claims, 2 Drawing Sheets

WINDOW CONSTRUCTION FOR VEHICLES

BACKGROUND OF THE INVENTION

1. Field of the Invention

The present invention relates to a window construction for vehicles, which is particularly applicable to a back window construction having a slidable glass pane and a fixed glass pane.

2. Description of the Related Art

A typical back window 1 for vehicles is illustrated in FIG. 3, of which has a sash frame 2 in a generally rectangular form. Within a window opening of the sash frame 2, two fixed glass panes 5 and two laterally slidable glass panes 6 are mounted. The movement of the slidable glass panes 6 is guided by rails formed on an upper portion 3 and a lower portion 4 of the sash frame 2.

A Japanese Utility Model Laid Open (Kokai) Publication No. 80114/1986 discloses a sample of the aforementioned sash frame which is described with reference to FIG. 4. The sash frame 100, having a generally E-shaped cross section, has two grooves **100*a*, 100*b* in parallel. The fixed glass panes 5 are housed in the outside groove 100*b* and the slidable glass panes 6 are housed in the inside groove 100*a*. Between a vehicle body B and the sash frame 2 a rubber seal member 102 is secured and the seal member 102 has side wall portions 102*c*, 102*d* extending along the side walls 100*c*, 100*d* of the sash frame 2, which have ends in the form of hooks 102*a*, 102*b* snapping to grip the edges of the side walls 100*c*, 100*d*, at the tip ends of the side wall portions 102*c*, 102*d***, respectively.

A seal member 101 is fixed on a bottom wall of the sash frame 2 and has seal lips **101*a*, 101*b* which slant toward said bottom wall and sealingly contact with side surfaces of the glass panes 5 and 6**.

However, there is a difficulty in gripping both the edges of side walls **100*c*, 100*d* of the sash frame 2 at the tip ends of the side wall portions 102*c*, 102*d* of the seal member 102 by making use of the hooks 102*a*, 102*b*. One approach to overcome this difficulty is to delete the outside hook 102*b* integral with the side wall portion 102*d*. In this case, the seal member 102 mounted on the sash frame 2 having the glass panes 5 and 6 is likely to be stretched and moved toward the room space of the vehicle when the seal member 102 and the sash frame 2 are mounted on the body B of the vehicle, so that when the interior location of the seal member 102** at the proper location is established with respect to the body B of the vehicle, a sufficient sealing characteristic is not effected.

SUMMARY OF THE INVENTION

It is, therefore, an object of the present invention to provide an improved window construction for vehicles which will overcome the aforementioned drawbacks.

Another object of the present invention is to provide a window construction for vehicles in which a sash frame is provided with a projection which extends into a recess or groove on a seal member to fixedly secure the seal member on the sash frame.

The object of the present invention can be achieved by providing a window construction for vehicles comprising a sash frame with a window opening for receiving at least one glass pane therein, and a seal member secured to the sash frame and also a vehicle's body, the sash frame having a projection outwardly extending from an outer surface thereof, and the seal member having a recess into which the projection of the sash frame is fitted to fixedly secure the seal member on the sash frame.

The projection is formed on an outside wall or a bottom wall of the sash frame, which is rectangular in shape. The glass panes are slidable along the upper and lower portions of the sash frame. The seal member is provided at its inside wall with a hook for gripping the edge of the inside wall of the sash frame and at its outside wall with an abutment portion for abutment engagement with the edge of the outside wall of the sash frame.

The above and other objects and features of the present invention will become apparent from the following description of preferred embodiments taking reference to the accompanying drawings.

DETAILED DESCRIPTION OF THE PREFERRED EMBODIMENTS

Figure 3:
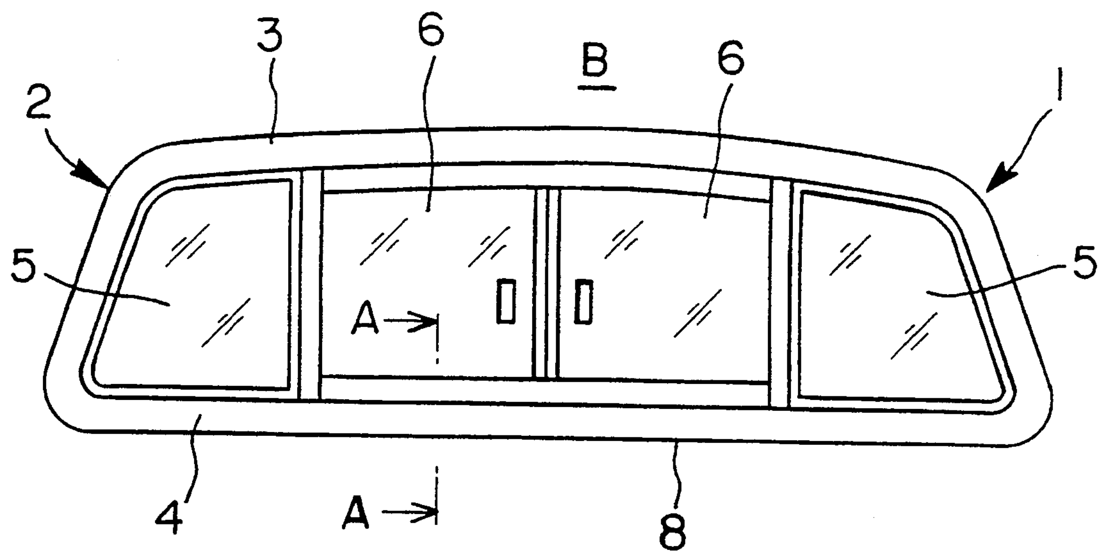
FIG. 3 is a front view of a typical vehicle back window construction for which the present invention is particularly applicable.
Figure 4:
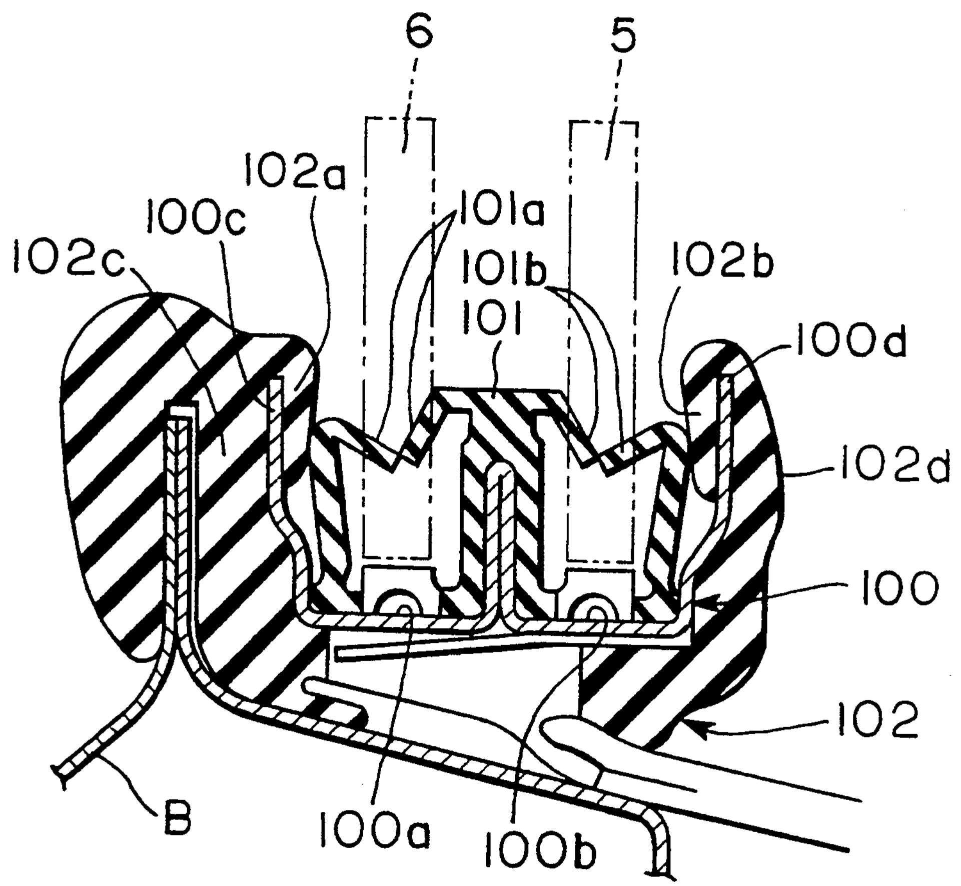
FIG. 4 is a cross sectional view of a lower portion of a conventional window construction.

Reference will be made to the drawings in order to facilitate understanding of the present invention, which correspond to a section taken along line A—A in FIG. 3, according to a vehicular window construction of the present invention.

Figure 1:
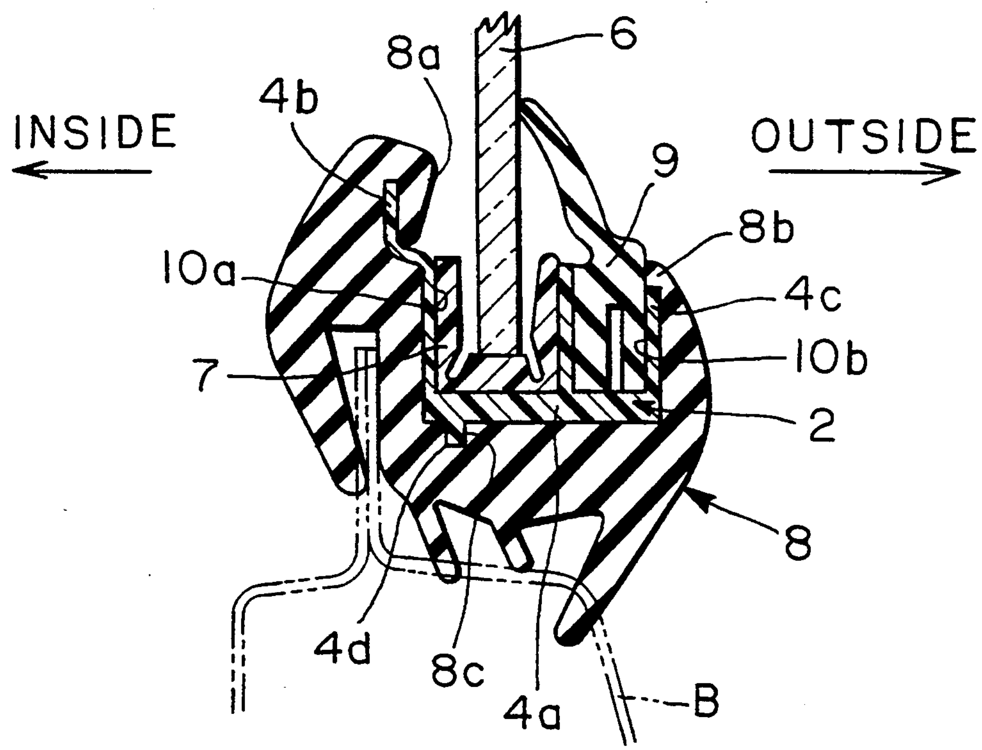
FIG. 1 is a cross sectional view taken along line A—A of FIG. 3 showing one embodiment of the present invention.

A window construction as shown in FIG. 1 has a sash frame 2 formed of extrusion of Al-based alloy and having a generally E-shaped cross section. Within an inside groove **10*a* of the sash frame 2, which is in the form of a rectangle, a slidable glass pane 6 is housed through a lower side glass run 7; and within an outside groove 10*b* of the sash 2 a weather strip 9 is disposed, which has a lip in contact with the surface of the glass pane 6 so that water or dust cannot enter from the vehicle exterior to the space in the groove 10*a***.

A seal member 8 made of a rubber material is adapted to be mounted on a vehicle's body B and has a hook **8*a* which grips the edge of an inside wall 4*b* of opposed side walls 4*b*, 4*c*** of the sash frame at the tip end of an inside wall portion of the seal member.

The sash frame 2 is provided with a projection **4*d* extending outwardly of the bottom wall 4*a*; and the projection 4*d* is fixedly secured in a recess or groove 8*c* formed on a corresponding location of the seal member 8 when the sash frame 2 and the seal member 8** are pre-assembled.

Even without the benefit of the hook, the upper portion **8*b* of the outside wall of the seal member 8 abuts the sash frame 2 on the edge of the outside wall 4*c*, as illustrated in FIG. 1**.

Figure 2:
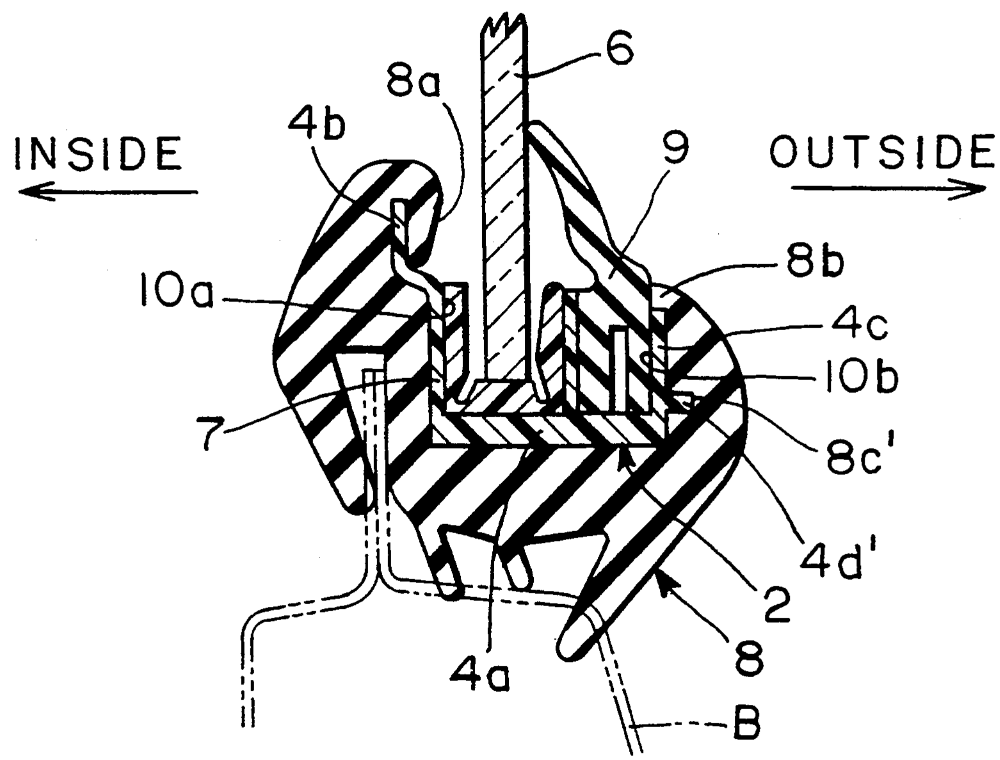
FIG. 2 is a cross sectional view taken along line A—A of FIG. 3 showing another embodiment of the present invention.

A second embodiment of the present invention is illustrated in FIG. 2, which has a basic structure similar to that described with reference to FIG. 1 so that the detail description of the basic structure will be omitted by showing corresponding parts with the same reference characters.

A projection 4d' is formed on the outside wall 4c of the sash member 2; and a recess 8c' is also formed in a corresponding part of the side wall of the seal member 8 so as to fixedly receive the projection 4d'.

The illustrated cross sections in FIGS. 1 and 2 correspond to sections of the lower portion of the sash frame, but cross sections of the upper portion and the side portions of the sash frame are substantially identical to those as illustrated.

The engagement of the projection 4d in the recess 8c or the engagement of the projection 4d' in the recess 8c' prevents the undesirable deformation of the seal member 8 toward the vehicle inside, due to a tension applied to the seal member 8 when the seal member 8 fitted on the sash frame 2 having the glass pane 6, is mounted on the vehicle's body B. Further, the engagement of the projection 4d or 4d' in the respective recess 8c or 8c', makes it possible to abut the upper portion 8b of the outside wall of the seal member 8 on the edge of the outside wall 4c of the sash frame 2 so that the man-hours for assembly of the sash frame 2 and the seal member 8 is considerably reduced for the reason that the task of gripping the upper part of the outside wall portion of the seal member 8 at the edge of the outside wall 4c of the sash frame 2 is eliminated.

The invention has thus been shown and described with reference to a specific structure; however, it should be noted that the invention is in no way limited to the details of the illustrated structures but changes and modifications may be made without departing from the scope of the appended claims.

What is claimed is:

1. A window construction for a vehicle body comprising a sash frame with a window opening for receiving at least one glass pane therein, and a seal member secured to the sash frame and the vehicle body, the sash frame having a projection outwardly extending from an outer surface thereof, and the seal member having a recess into which the projection of the sash frame is fitted to fixedly secure the seal member on the sash frame.

2. A window construction for a vehicle body according to claim 1, wherein the projection is formed on an outside side wall of the sash frame, and the recess is formed in the seal member at a location corresponding to the location of the projection.

3. A window construction for a vehicle body according to claim 2, wherein the seal member has an inside wall with a hook for gripping an edge of an inside wall of the sash frame, the seal member having an outside wall with an abutment portion in abutment engagement with an edge of an outside wall of the sash frame.

4. A window construction for a vehicle body according to claim 3, wherein the sash frame is rectangular in configuration and has an inside groove for receiving at least one glass pane and an outside groove for positioning a weather strip with a lip in sealing contact with a surface of the glass pane.

5. A window construction for a vehicle body according to claim 1, wherein the projection is formed on a bottom-wall of the sash frame, and the recess is formed in the seal member at a location corresponding to a location of the projection.

6. A window construction for a vehicle body according to claim 5, wherein the seal member has an inside wall with a hook for gripping an edge of an inside wall of the sash frame, the seal member having an outside wall with an abutment portion in abutment engagement with an edge of an outside wall of the sash frame.

7. A window construction for a vehicle body according to claim 6, wherein the sash frame is rectangular in configuration and has an inside groove for receiving at least one glass pane and an outside groove for positioning a weather strip with a lip in sealing contact with a surface of the glass pane.

* * * * *